United States Patent
Kesper et al.

(10) Patent No.: US 8,252,448 B2
(45) Date of Patent: Aug. 28, 2012

(54) APPARATUS FOR SEALING TUBE PLATES OF BATTERIES

(75) Inventors: Heinrich Kesper, Willingen (DE); Ferdinand Von Alvensleben, Bad Wünnenberg-Fürstenberg (DE); Walter Clemens, Bergisch Gladbach (DE)

(73) Assignee: Hoppecke Batterien GmbH & Co. KG (DE)

( * ) Notice: Subject to any disclaimer, the term of this patent is extended or adjusted under 35 U.S.C. 154(b) by 1063 days.

(21) Appl. No.: 12/085,458

(22) PCT Filed: Nov. 24, 2006

(86) PCT No.: PCT/EP2006/011284
§ 371 (c)(1),
(2), (4) Date: Jul. 31, 2008

(87) PCT Pub. No.: WO2007/059987
PCT Pub. Date: May 31, 2007

(65) Prior Publication Data
US 2009/0293264 A1    Dec. 3, 2009

(30) Foreign Application Priority Data
Nov. 26, 2005 (DE) .......... 10 2005 056 430

(51) Int. Cl.
*H01M 10/38* (2006.01)

(52) U.S. Cl. .......... 429/123; 29/730
(58) Field of Classification Search .......... 29/730; 429/730
See application file for complete search history.

(56) References Cited

U.S. PATENT DOCUMENTS 4,359,509 A * 11/1982 Guimond et al. .......... 429/140

FOREIGN PATENT DOCUMENTS

| DE | 1 082 639 B | 6/1960 |
| DE | 11 42 925 B | 1/1963 |
| DE | 33 01 988 A | 7/1984 |
| GB | 2026761 | * 2/1980 |
| GB | 2 043 328 A | 10/1980 |
| GB | 2 160 700 A | 12/1985 |

OTHER PUBLICATIONS

Translation of International Preliminary Report on Patentability for PCT/EP2006/011284 (Jul. 17, 2008).

* cited by examiner

*Primary Examiner* — Ula C Ruddock
*Assistant Examiner* — Jacob Marks
(74) *Attorney, Agent, or Firm* — Harness, Dickey & Pierce, P.L.C.

(57) ABSTRACT

The present invention relates to an apparatus for sealing tube plates of batteries, preferably lead-acid batteries, comprising a base body, on which projections are arranged, and when the apparatus is arranged in the intended manner, the projections engage at the end in the tubes of the tube plate.

15 Claims, 3 Drawing Sheets

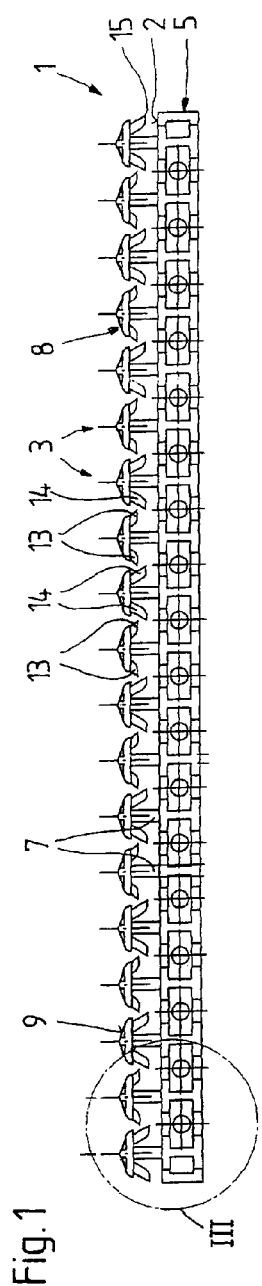
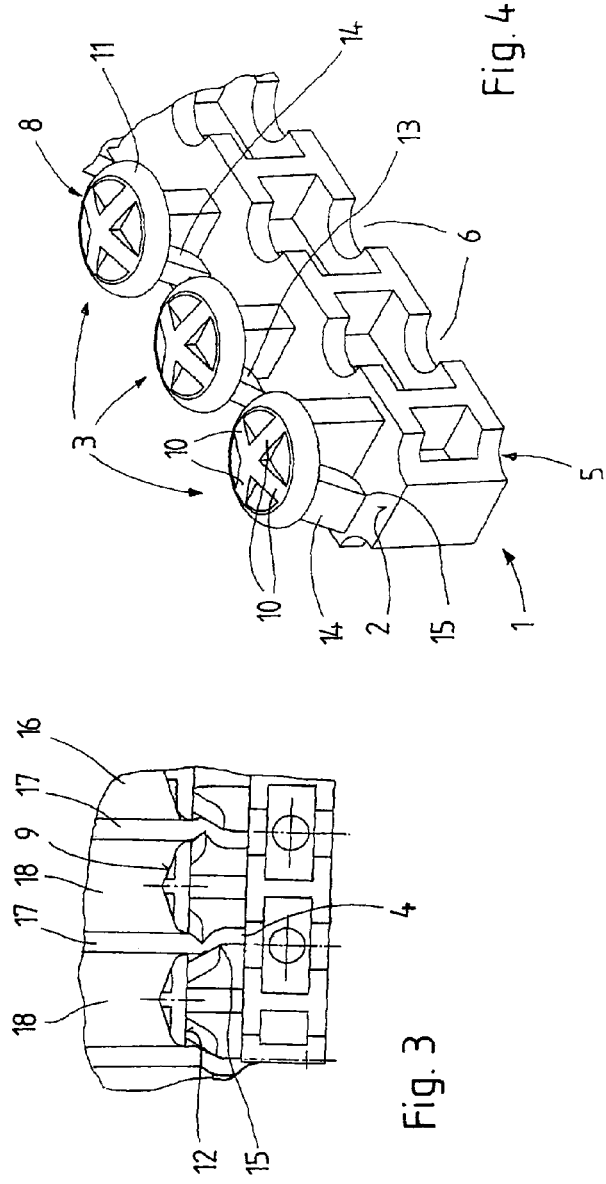
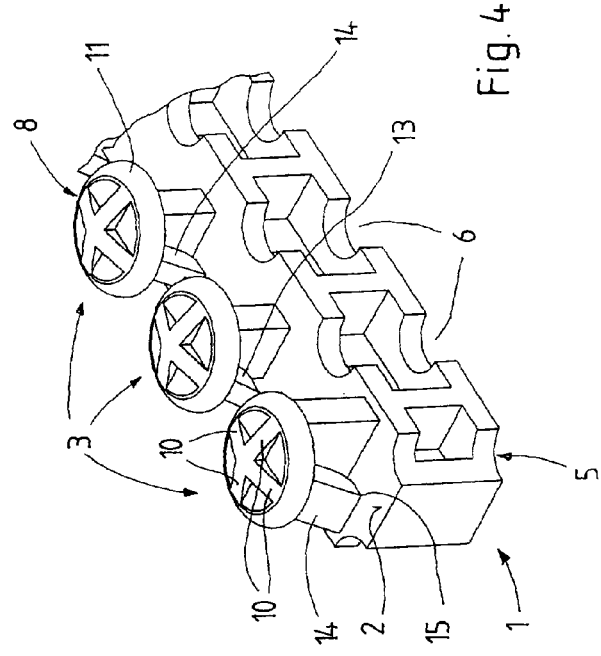

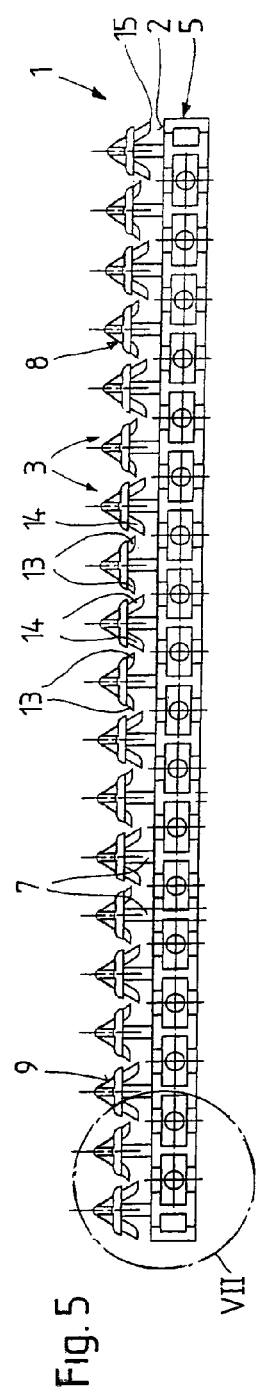
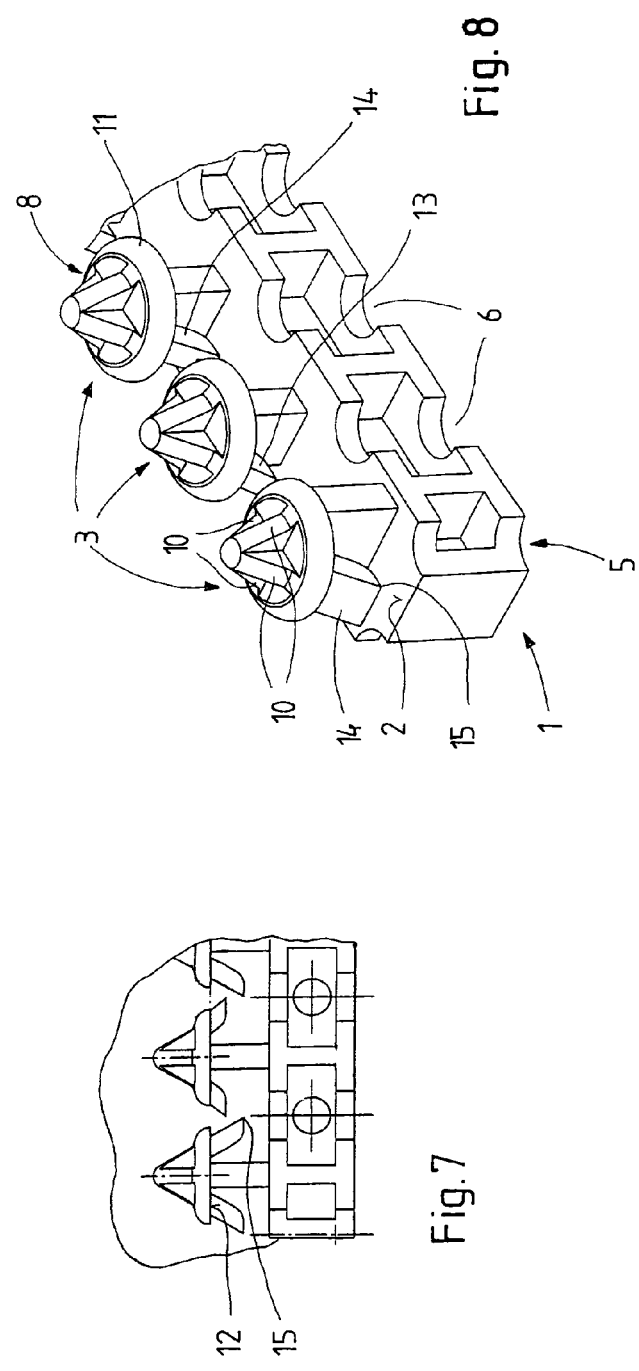
Fig. 5
Fig. 6
Fig. 7
Fig. 8

APPARATUS FOR SEALING TUBE PLATES OF BATTERIES

CROSS-REFERENCE TO RELATED APPLICATIONS

This application is a U.S. National Stage Application of International application No. PCT/EP2006/011284, filed Nov. 24, 2006 and published in German as WO 2007/059987 A1 on May 31, 2007. This application claims the benefit of German Application DE 10 2005 056 430.5, filed Nov. 26, 2005. The disclosure(s) of the above applications are incorporated herein by reference.

The present invention relates to an apparatus for sealing tube plates of batteries, preferably lead-acid batteries, comprising a base body, on which projections are arranged, and when the apparatus is arranged in the intended manner, the projections engage at the end in the tubes of the tube plate.

Different devices for sealing tube plates are known from the state of the art. Thus, GB 1 428 978 for example discloses an oblong cover for tube plates of batteries, which cover is made of a plastic material and is slipped on the end regions of the tube plate and then shrunk on them under the influence of heat.

GB 2 043 328 A discloses a closing cover strip for tube plates which comprises a plurality of interconnected round tongue-and-groove seals made of plastic. One seal respectively closes one tube of the tube plate. At their ends on the side of the tube plate the seals comprise a through hole for receiving bar-like cores that are arranged inside the tube plate. The opening for receiving the core is provided with a conical elastic border that firmly clings to the core to be received due to its elasticity and thus serves for fastening the baseboard in the tube plate.

GB 2 160 700 A discloses a baseboard for tube plates comprising round sealing elements, which baseboard is provided with a through hole for receiving cores that are placed inside the tube plate. On its side opposite the tube plate, the baseboard comprises recesses such that the end regions of the cores that are received in the through holes are bare and accessible. After having mounted the baseboard on the tube plate the regions of the cores that project through the through hole are permanently plastically deformed, such that a detachment of the closing strip from the tube plate is not possible.

DE 32 07 601 C1 discloses a device and a method for automatically filling tube plates, in which frame boards are welded to the tube plates by means of an ultrasound welding outfit after having been filled with an active pasty mass.

DE 39 32 283 A1 discloses a tube plate filling machine, in which tube plates are sealed manually by means of self-locking barbed frame boards according to the dowel principle.

Based upon the above described state of the art it is the object of the present invention to propose an apparatus for sealing tube plates according to the preamble of claim 1 that is improved in comparison to the state of the art and that can be preferably automatically fixed on the tube plate in a safe and permanent manner after assembly with this one, without any additional process steps for fastening this one or any paste-tight sealing, such as welding, gluing or shrinking, and that simultaneously prevents a leakage of the active material inside the tube plate.

This aim is achieved by an apparatus having the characteristics of the preamble of claim 1, that is characterized in that the apparatus is fixed on the tube plate by means of the projections prestressed with respect to the walls of the tubes.

The apparatus according to the invention is preferably automatically arranged after having filled the tube plate with the active pasty mass. Herein, the end side of the apparatus is slipped on the tube plate, such that the projections penetrate into the openings on the end side of the tubes. In the correct position of the apparatus, the projections get jammed with the walls of the respective tube in whatever way. Due to the clamping effect between projection and tube wall a safe and permanent reception of the apparatus is assured. A sealing of the tube plate against a leakage of the pasty mass can be realized both by a mass-tight contact between the projections and the walls and by a mass-tight contact of the tube plate and the base body.

Preferably, at least two adjacent projections are provided with catch means that get jammed with the walls of the tubes. The catch means can principally have any form. Catch means that run around the circumference of the projections like a ring are especially advantageous since these ones can be used, apart from the clamping effect, for sealing the tube plate. However, also catch means in form of hooks or similar are imaginable that are placed at certain points of the circumference of the projections. In this case, the tube plate is preferably sealed by the base body. The catch means are preferably formed such that they enable a simple insertion of the apparatus into the tube plate and, if the attempt is made to separate them, they simultaneously get jammed with the walls such that a detachment of the apparatus will be prevented.

An especially advantageous embodiment of the apparatus provides that the regions of the catch means of adjacent projections which contact the walls are differently spaced from the base body. In this way, interspaces are formed between the projections located on the base body, which interspaces are formed like a labyrinth. If the apparatus is arranged in the intended manner on the tube plate after having filled this one with active pasty mass, the wall or the walls of adjacent tubes of the tube plates are placed in the interspaces. The width of the interspaces depends on the thickness of the wall or walls that are placed inside them. The distance between the regions of the catch means contacting the wall is smaller than the thickness of the wall or walls present in the interspace. The walls that are electrolyte permeable and paste-tight deform in accordance with the form of these interspaces. Due to the self-stability and elasticity of the walls, clamping forces are generated between the wall and the catch means. These clamping forces are reinforced by the deformations that are transverse with respect to the jointing direction of the apparatus according to the invention and the tube plate, whereby the hold of the apparatus in the tubes is advantageously improved. A safe and permanent reception of the walls in the interspaces between the projections—i.e. a safe and permanent reception of the apparatus on the tube plate—and on the other hand, an excellent sealing with respect to a leakage of pasty active material that is present in the tube plates will be achieved.

An especially safe hold of the apparatus according to the invention will be obtained according to a special embodiment, in that the regions of the catch means of adjacent projections contacting the walls overlap in a parallel direction with respect to the base body. Hereby, an especially strong deformation of the wall areas located between the projections will be achieved, such that the clamping forces which are present there will increase.

A preferred embodiment provides that the projections comprise a pin like connection area placed at the base body and the end of this connection area opposite the base body comprises a head portion. The outer contour of this head portion is preferably formed corresponding to the inner transverse section of the respective tube.

Furthermore, the invention proposes that the projections can comprise an annular wall which is placed at the base body and the side of which opposite the base body is in turn closed by a head portion, such that a hollow space is formed between the head portion and the annular wall. The outer contour of this head portion is also preferably formed corresponding to the inner transverse section of the respective hollow space of the tube plate. Both embodiments can be manufactured by simple means and enable a position defined and stable reception of the individual projections in the respective tubes. Advantageously, the dimensions of the outer contour of the head portion correspond to the inner transverse section of the respective tube, whereas both the pin-like connection area and the annular wall present an outer contour having a reduced transverse section size with respect to the head portion. Such a design facilitates the insertion of the projections into the respective tubes as well as the deformation of the walls. Simultaneously, a stable and permanent fixation of the head portions at the base body of the apparatus is assured. Independent from the pin-like connection area or the annular wall, the head portion can be formed corresponding to the inner transverse section of the respective hollow space.

The different spacing of the regions of the catch means of adjacent projections contacting the walls from the base body can be obtained according to an advantageous proposal of the invention in that the head portions of the projections are equally spaced from the base body of the apparatus, whereas the catch means present different lengths. In this way it is assured that the head portions of the projections penetrate with the same depth into the respective tubes. Thus, a constant volume of the individual tubes of the tube plate is assured, which means that the electric cells formed by respectively one tube can receive the same quantity of the pasty active mass and then possess a mutually adjusted efficiency.

Furthermore, the invention proposes that the head portions of adjacent projections are differently spaced from the base body. In this case it is especially advantageous that one can do without catch means of different lengths, whereby a safe hold of the walls on the border of the head portion and an improved paste-tight sealing of the end side of each tube is assured.

According to another embodiment of the invention, the catch means are located at the head portion. In this way, a safe contact between catch means and walls of the tube plate and the sufficient clamping thereof are guaranteed, since thus it is assured that the catch means are inserted into the respective tube with a sufficient depth. The catch means can be projections that run around the entire head portion or hooks that are located on the head portion. The number and position of the hooks on the head portion can be chosen arbitrarily, but it has proved advantageous that the hooks are placed on the side of the head portion facing the base body. For forming the labyrinth between adjacent projections, the catch means are preferably arranged at points of adjacent projections that face each other. The catch elements are preferably elastic, such that they can cling to the respectively generated contours of the walls. Independent from the fact whether the catch means are a surrounding projection or a hook, they advantageously extend from the head portion into the direction of the base body radially outwards. Thus, the insertion of the apparatus according to the invention into a tube plate is facilitated, since due to their elasticity the catch means spring into the direction of the connection pin or the annular wall. A detachment of the apparatus and the tube plate is however not or only hardly possible, since the catch means spring into the interspace formed between the projections due to their orientation and thus the clamping forces between the wall or walls and the catch means clinging to them increase. After the insertion of the projections into the tube plate, the automatic fixation thereof will thus be assured by the embodiment according to the invention. The catch means are arranged on the head portion such that the wall preferably sits close on the head portion itself, whereby a tight sealing of the opening on the end side of the hollow spaces is enabled and a leakage of the pasty active material is prevented. If the catch elements are hooks, the head portion is formed in this case such that the sealing is guaranteed.

According to another embodiment of the invention, the head portions of the projections comprise a conical contour on their side opposite the base body. This contour facilitates the insertion of the head portions or the projections into the corresponding tubes of the tube plate. The conical contour can have the form of a conical outer surface or the form of individual surfaces that are arranged in a conical manner with respect to each other. In any case, the contour serves for guiding the regions at the end of the walls such that these ones are automatically guided in the intended manner into the interspaces formed between the projections upon insertion of the apparatus according to the invention.

According to another embodiment of the invention, the base body is essentially formed like a board. The dimensions of the base body as well as the number of the projections arranged on this one are adapted to the number of the tubes of the tube plate as well as to the dimensions thereof. It is especially advantageous that the base body comprises a stopping face against which the walls push the tube plate in a preferably sealing manner—i.e. preventing a leakage of the pasty active material—in case of a correct arrangement. The stopping face assures on the one hand that the projections penetrate with a defined depth into the respective hollow spaces, and on the other hand an additional sealing effect is achieved, apart from the sealing effect obtained by the head portions of the projections.

An especially advantageous embodiment of the invention provides that at least one projection is formed like a straddling dowel as a hollow body having a through hole that is perpendicular to the base body. An expanding element is located in this through hole. As described above, the apparatus is inserted with the end side into the tube plate. Simultaneously with the insertion or immediately after the apparatus has reached its final position in the tube plate, the expanding element is preferably automatically inserted into the projection in the direction of the tube plate. Thereby, the diameter of the projection is enlarged, which causes a clamping effect between the projection and the tube wall. In order to facilitate an enlargement of the projection, the head portion of the expanding element can be slotted. Furthermore, the through hole can taper in the direction of the tube plate.

Other advantages and embodiments of the present invention will appear from the following non-limiting and exemplary description of preferred embodiments by means of the figures. Herein:

FIG. 1 is a side view of a first embodiment,

FIG. 2 is a plan view of the embodiment of FIG. 1,

FIG. 3 is an enlarged partial view of FIG. 1,

FIG. 4 is a perspective view of the embodiment of FIG. 1,

FIG. 5 is a side view of a second embodiment,

FIG. 6 is a plan view of the embodiment of FIG. 5,

FIG. 7 is an enlarged partial view of FIG. 5,

FIG. 8 is a perspective partial view of the embodiment of FIG. 5,

Figure 9:
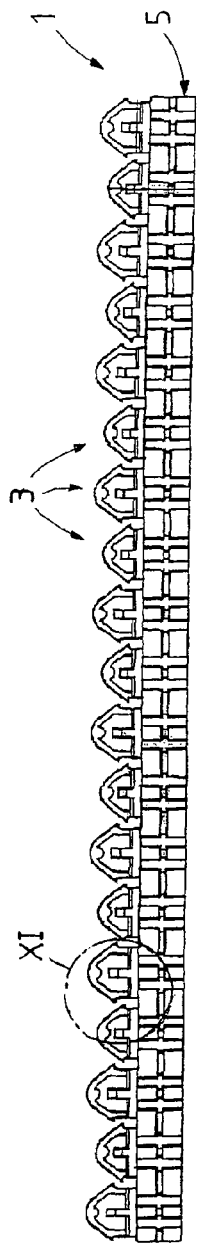
FIG. 9 is a side view of a third embodiment.

FIG. 1 shows a side view of a first embodiment of the apparatus according to the invention as a frame board 1. The frame board 1 is a longitudinal strip-like profile element having a base body 5, the side face 2 of which that is facing a tube plate when this one is fixed accordingly, carries projections 3 which penetrate into the tubes 18 of the tube plate 16. The side face 2 facing the tube plate 16 is even and serves as stop face for wall ends 4 of the tube plate 16. The base body 5 of the frame board 1 is provided with numerous recesses 6 that serve for a subsequent fixation of the frame board 1 together with a mounted tube plate 16 in a battery housing.

The projections 3 of the frame board 1 are composed of a connection pin 7 as well as a head portion 8. The connection pin 7 is located on the side face 2 of the base body 5 that faces the tube plate 16 and carries the head portion 8 on the side opposite the base body 5. In the represented exemplary embodiment, the head portion 8, the connection pin 7 and the base body 5 are formed as an integral injection moulded element.

The side of the head portion 8 opposite the base body 5 is provided with an outer contour 9 that is conical in the direction of the connection pin 7. The conical outer contour 9 is formed by four inclined partial surfaces 10 which are placed with an angle of 90° with respect to each other—as it is in particular visible in FIG. 4. Adjacent to the conical outer contour 9, the head portion 8 comprises a bordering edge 11 having a curved contour. On the bottom side 12 of the head portion 8 facing the base body 5 catch means 13, 14 are provided. The catch means 13, 14 extend from the bottom side 12 slantwise outwards in the direction of the base body 5, such that their tips 15 project over the bordering edge 11 of the head portions 8. They are at least partially made of an elastic material or they present a certain elasticity due to their shape. The length of the catch means is different, such that the catch means 13 are short in comparison to the catch means 14 and their tips 15 are more spaced from the base body 5 than the tips 15 of the catch means 14. Each projection 3 comprises two catch means 13, 14. Herein, the catch means 13, 14 are facing each other on the bottom side 12 of the head portion 8, such that the catch means 13 of a projection 3 face the catch means 14 of the adjacent projections 3. Observing the interspace between the projections 3 and the catch elements 13, 14, one sees that this interspace is formed like a labyrinth.

FIG. 3 exemplarily shows the reception of wall ends 4 of an indicated tube plate 16. The regions of the walls 17 that are placed in the interspaces formed between the projections 3 are elastically or plastically deformed by the above described arrangement of the catch means 13, 14, such that the walls 17 sit in a sealing manner on the bordering edge 11 on the one hand and are bent around the catch means 13, 14 on the other hand, such that a safe hold of the projections 3 in the tube 18 of the tube plate 16 is assured. With the correct fixation as represented in FIG. 3, the wall ends 4 of the walls 17 lean on the side face 2 of the base body 5. Apart from the sealing obtained by means of the bordering edge 11, another sealing 18 is achieved at the end thanks to this rest.

Thanks to the catch means 13, 14 oriented slantwise outwards and into the direction of the base body 5, it is easily possible to insert the frame board 1 into the tube plate 16, since due to their elasticity the catch means 13, 14 spring into the direction of the connection pin 7. If the frame board 1 is detached from the tube plate 16, the catch means 13, 14 will spring out into the opposite direction, i.e. away from the connection pin 7. Therefore a separation of the connection is prevented or at least essentially aggravated because of the deformation of the walls 17.

FIGS. 5 through 8 show an embodiment that is similar to the above described embodiment. The represented embodiment essentially resembles the above described one. However, in contrast to the embodiment of the FIGS. 1 through 4, the conical outer contour 9 is considerably steeper, which highly facilitates the insertion of the frame board 1 into the tube plate 16 in comparison to the above described embodiment.

Figure 10:
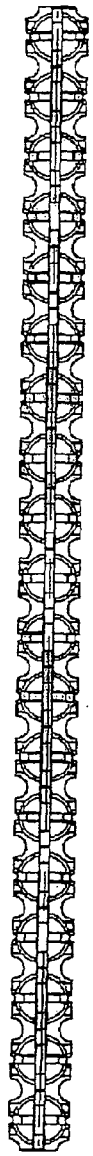
FIG. 10 is a plan view of the embodiment of FIG. 9.
Figure 11:
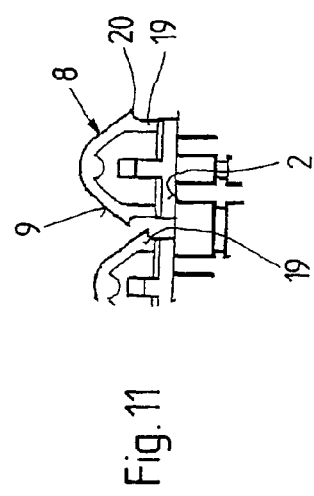
FIG. 11 is an enlarged partial view of the embodiment of FIG. 9.

Another preferred third embodiment of the invention is represented in FIGS. 9 through 11. The frame board 1 comprises a base body 5, on the side face 2 of which numerous projections 3 are placed. If the frame board 1 is arranged in the intended manner on a tube plate 16, the projections 3 will be inserted into the tubes 18 between the walls 17.

The projections 3 comprise an annular wall 19, with which they are arranged on the side face 2 of the base body 5. On the side of the annular wall 19 opposite the base body 5 a conical head portion 8 is located. Due to the annular walls 19 and the conical head portion 8, the projections 3 are hollow and can be at least partially made of elastic material. The annular walls 19 of mutually adjacent projections 3 comprise different lengths perpendicular to the side face 2. In this way it is achieved that the head portions 8 of mutually adjacent projections 3 are spaced with different distances from the side face 2 of the base body 5. At the transition between the annular wall 19 and the head portion 8 each projection 3 is provided with an annular projection or collar 20 that projects outwards. This collar 20 serves as catch means that contacts the walls 17 of the tube plate 16, if the frame board 1 is fixed correctly. As in the embodiments of the FIGS. 1 through 9, it is also achieved in the here described embodiment that the walls 4 between the projections 3 deform and thus a safe and firm hold of the frame board 1 in the tube plate 16 is assured.

Figure 12:
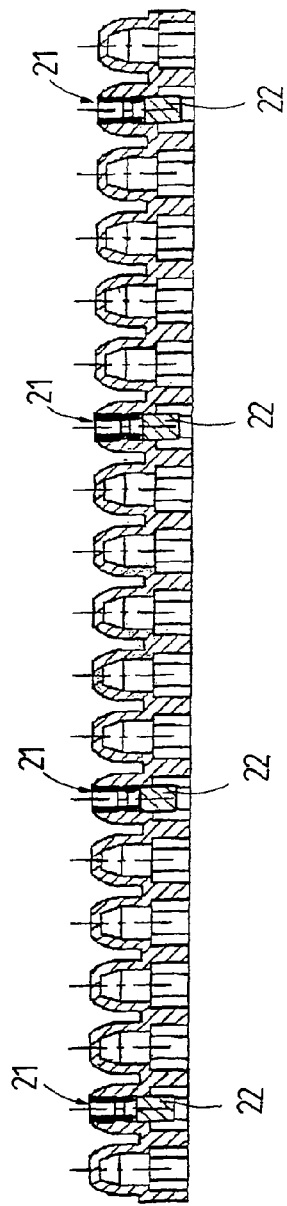
FIG. 12 is a side view of another embodiment.

FIG. 12 shows another embodiment of the invention. Some of the projections 3 are provided with a through hole 21, through which the projections 3 penetrate perpendicular to the side face 2. The through hole 21 comprises a reduced transverse section 23. A clamping element 22 is placed in the through hole 21. The positions of the clamping elements 22 shown in FIG. 12 are present before and during the mounting of the frame board 1. The clamping elements 22 only partially penetrate into the through holes 21. Herein, they do not contact the area of the reduced transverse section 23. If the frame board 1 is in its intended position in the tube plate 16, the clamping elements 22 are pushed deeper into the through holes 21, such that the projections 3 are straddled and get jammed in the tubes 18 due to the interaction of the clamping elements 22 and the reduced transverse section 23.

The invention claimed is:

1. An apparatus for sealing tube plates of batteries, comprising:
   a tube plate of a battery, the tube plate having tubes;
   a base body;
   projections which are arranged on said base body, wherein, when the apparatus is slipped on the tube plate, the projections engage into the tubes of the tube plate of the battery, wherein the projections are prestressed with respect to the walls of the tubes and the apparatus is fixed by means of said projections prestressed with respect to the walls of the tubes;
   at least two adjacent projections being provided with catch means that are jammed with the walls of the tubes; and
   wherein the regions of the catch means of adjacent projections contacting the walls are arranged with respect to each other that portions of the walls are deformed between adjacent projections, and wherein the catch means of one projection contacts an outer surface of a tube wall at one location and catch means of an adjacent projection contacts an inner surface of the same tube wall at a different location.

2. An apparatus according to claim 1, wherein regions of the catch means of adjacent projections contacting the walls overlap in a parallel direction with respect to the base body.

3. An apparatus according to claim 1, wherein the projections comprise a pin shape connection area arranged on the base body, and at the end of said connection area opposite the base body a head region is placed, the outer contour of which is corresponding to the inner transverse section of the respective tube of the tube plate.

4. An apparatus according to, claim 1, wherein the projections comprise an annular wall arranged on the base body, and the side of the annular wall opposite the base body is sealed by a head portion, the outer contour of which is corresponding to the inner transverse section of the respective tube of the tube plate.

5. An apparatus according to claim 3, wherein the head portions of the projections are equally spaced from the base body and the catch means comprise different lengths.

6. An apparatus according to claim 3, wherein the head portions of the projections are differently spaced from the base body.

7. An apparatus according to claim 3, wherein the catch means are arranged on the head region.

8. An apparatus according to claim 3, wherein the head portions have a conical contour on their side opposite the base body.

9. An apparatus according to claim 3, wherein the head portions are at least partially elastic.

10. An apparatus according to claim 3, wherein the catch means are formed as a projection bordering the head portion.

11. An apparatus according to claim 3, wherein the catch means are hooks that are placed at mutually opposite points of the head portions of adjacent projections.

12. An apparatus according to claim 1, wherein the base body is formed like a board.

13. An apparatus according to claim 1, wherein the base body comprises a stop face against which the walls of the tube plate abut.

14. An apparatus according to claim 1, wherein at least one projection as a through hole and a spreading element is arranged in the through hole of the projection.

15. An apparatus according to claim 1, wherein the projection taper in the direction of the tube plate.

\* \* \* \* \*